April 29, 1947.    H. E. EMMOTT    2,419,712
CONCAVE CLUTCH
Filed Sept. 29, 1944
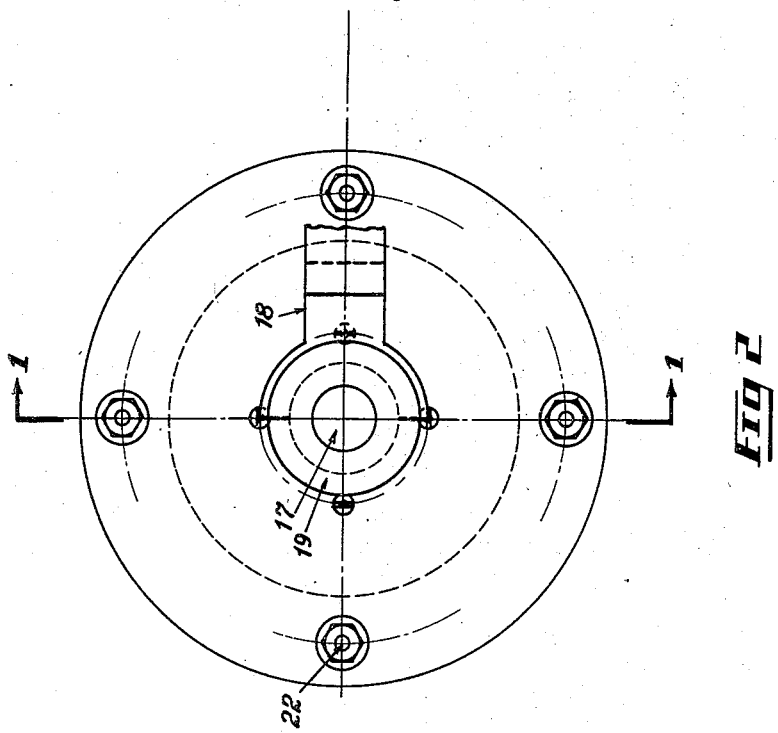
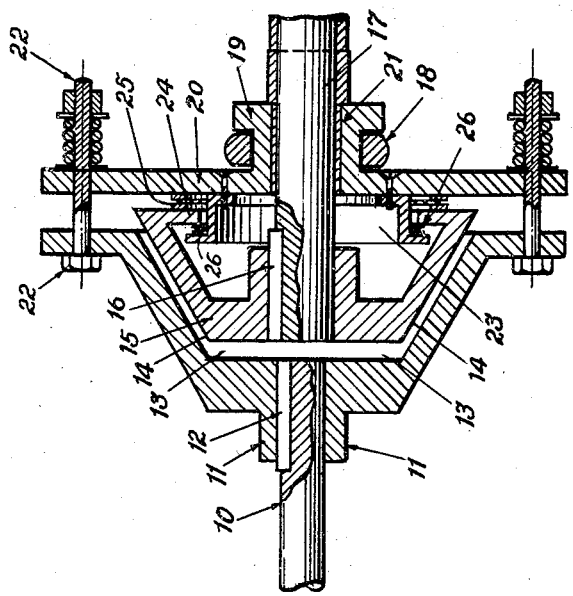
Herbert E. Emmott, Inv.,
Atty.

Patented Apr. 29, 1947

2,419,712

UNITED STATES PATENT OFFICE 2,419,712

CONCAVE CLUTCH

Herbert Edwin Emmott, Manville, Alberta, Canada

Application September 29, 1944, Serial No. 556,411

2 Claims. (Cl. 192—66)

This invention is related to the art of power transmission and more specifically to a friction clutch.

The invention has for its primary object the provision of a positively engaging driven member with a driving member by means of coacting conical friction faces.

Another object of the invention is to provide a supplemental engagement force acting to yieldingly engage the two members while permitting a greater load to be transmitted between the two before slippage occurs.

Still other objects of a more general nature are to provide a durable, relatively incomplex and efficient device of the character set forth.

With the above noted and other objects in view which may appear as the description proceeds the invention resides in the novel construction, combination and arrangement of cooperating parts claimed and shown in the accompanying drawings forming part of this application and in which:

Fig. 1 is a sectional view of my invention taken along the line 1—1 of Figure 2.

Fig. 2 is an end elevational view thereof as seen from the driven end.

Referring more in detail to the drawings in which similar reference characters designate corresponding parts throughout the several views it will be seen that the invention consists of a drive shaft 10, actuated by a suitable source of power, not shown. The driving member 11, of the clutch is keyed at 12, to the drive shaft 10, so that it will rotate as the drive shaft rotates. The driving member 11, has formed therein a female frustroconical shaped friction face 13, which coacts with the male, frustro-conical shaped friction face 14, of the driven member 15. This driven member 15, is keyed at 16, to the driven shaft 17, so that when the member 15, is caused to rotate the shaft 17, will rotate therewith in a positive manner.

The coacting frictional faces 13, 14, are brought into and out of engagement by means of a conventional forked actuating rod 18, which is mounted in the actuating collar 19. A disk 20, is formed integrally with the collar 19, the whole freely disposed on the driven shaft 17, and rotatable independently of the said shaft. A bushing 21, is provided to reduce the frictional contact between the two.

By means of the actuating rod the disk 20, may be moved toward the driving member 11, aided by means of the four springs carried by bolts 22. This movement in turn moves the frictional face 14, of the male member toward the frictional face 13, of the female member until engagement of the two is accomplished. The keyway 16, permitting movement longitudinally on the shaft 17, whilst preventing rotational movement of the member 15, as the said shaft rotates.

To disengage the member 11, 15, an annular radially extending flange 23, secured to the disc 20, contacts the inwardly extending flange 24, of the member 15, when the disc 20, is moved backward thus drawing the friction faces apart.

The relative speeds of the contacting faces between the disk 20, and flange 24, and the flange 23, and flange 24, will vary, therefore, I have provided a plurality of thrust bearings 25, between the former and a plurality of thrust bearings 26, between the latter.

It is believed that the construction and advantages of the structure shown may be apparent from the foregoing paragraphs taken in conjunction with the accompanying drawings without further detailed description.

While the preferred embodiment of the invention has been disclosed, it is understood that minor changes in the details of construction, combination and arrangement of cooperating parts may be resorted to within the scope of what is claimed without departing from the spirit of the invention.

I claim:

1. A clutch comprising a drive member, a driven member, said drive and driven members having co-acting frustro-conical faces, a disk movable to engage the driven member with the drive member, bolts connecting said drive member with said disk, expansion springs carried by said bolts normally urging said disk towards said driven member, a clutch collar carried by said disk, means engaged with said clutch collar for retracting said disk and means connecting said disk to said driven member for disengaging the driven member from the drive member upon retraction of said disk.

2. A clutch comprising a drive shaft, a female frustro-conical clutch member fixed on said drive shaft, a driven shaft, a male frustro-conical clutch member keyed on said driven shaft and movable longitudinally into and out of engagement with the female clutch member, a clutch collar slidably mounted on said driven shaft, a disk carried by said collar adapted to move said male clutch member towards said female clutch member, an annular flange extending from said disk having loose engagement with said male clutch member for moving the male clutch member away from said female clutch member, bolts connecting said female clutch member with said disk, and expansion springs carried by said bolts normally urging said disk towards said male clutch member for engaging the male clutch member with the female clutch member.

HERBERT EDWIN EMMOTT.

REFERENCES CITED

The following references are of record in the file of this patent:

UNITED STATES PATENTS

| Number | Name | Date |
| --- | --- | --- |
| 2,060,691 | Rockwell | Nov. 10, 1936 |
| 1,513,202 | Wemp | Oct. 28, 1924 |
| 1,446,657 | Parsons | Feb. 27, 1923 |
| 1,438,457 | Morton | Dec. 12, 1922 |